United States Patent [19]
Nojiri et al.

[11] Patent Number: 5,612,395
[45] Date of Patent: *Mar. 18, 1997

[54] PIGMENT GRINDING RESIN COMPOSITION FOR ELECTRODEPOSITION PAINT AND PIGMENT PASTE CONTAINING THE SAME

[75] Inventors: Hiroyuki Nojiri; Ichiro Kawakami, both of Takatsuki; Mitsuo Yamada, Suita, all of Japan

[73] Assignee: Nippon Paint Co., Ltd., Osaka-fu, Japan

[ * ] Notice: The portion of the term of this patent subsequent to Jan. 9, 2015, has been disclaimed.

[21] Appl. No.: 370,299

[22] Filed: Jan. 9, 1995

[30] Foreign Application Priority Data

Jan. 10, 1994 [JP] Japan .................................. 6-000786

[51] Int. Cl.$^6$ .............................. C08K 3/20; C08L 63/02
[52] U.S. Cl. ................................................. 523/415
[58] Field of Search ............................................... 523/415

[56] References Cited

U.S. PATENT DOCUMENTS 5,401,782  3/1995  Kawakami et al. ................... 523/415

Primary Examiner—Melvyn I. Marquis
Assistant Examiner—D. Aylward
Attorney, Agent, or Firm—Wenderoth, Lind & Ponack

[57] ABSTRACT

A pigment grinding resin composition for an electrodeposition paint comprising a cationic pigment grinding resin obtained by reacting a modified epoxy resin with sulfide in the presence of a monobasic acid and a hydroxyl group-containing dibasic acid, wherein said modified epoxy resin is obtained by reacting at least one epoxy resin having an epoxy equivalent of 150 to 2000 selected from the group consisting of bisphenol A, F and S type epoxy resins with a half-blocked diisocyanate, and wherein said sulfide is selected from the group consisting of 1-(2-hydroxyethylthio)-2-propanol, 1-(2-hydroxyethylthio)-2-butanol and 1-(2-hydroxyethylthio)-3-butoxy-1-propanol. By introducing the acid group into the epoxy resin, the dispersibility of the pigment and the compatibility with the main binder, etc., is improved. By using this pigment grinding resin, a pigment paste, as well as an electrodeposition paint can be produced having excellent storage stability and excellent corrosion resistance in respect to films produced therefrom.

6 Claims, No Drawings

PIGMENT GRINDING RESIN COMPOSITION FOR ELECTRODEPOSITION PAINT AND PIGMENT PASTE CONTAINING THE SAME

FIELD OF THE INVENTION

The present invention relates to a pigment grinding resin composition which can suitably be used as a pigment grinding agent for an electrodeposition paint, and to a pigment paste containing the same.

BACKGROUND OF THE INVENTION

Electrodeposition coating is a method wherein aqueous paint is filled in a tank and paint components are electrophoretically moved and deposited onto a surface of an object to be coated present in the tank. The main application of this electrodeposition coating is anti-corrosion coating of car bodies and it is industrially important.

In general, an electrodeposition paint contains a pigment and a pigment grinding agent. In order to introduce a pigment into paint, a pigment paste obtained by grinding the pigment in an aqueous medium at a high concentration is used as an intermediate composition. To the pigment paste, a dispersing agent is formulated to give sufficient dispersion stability to the pigment paste. The dispersing agent is required to have the characteristic of increasing the dispersion stability of the pigment paste as well as performances to keep the paint stable for a prolonged period when the pigment paste is made into an electrodeposition paint by diluting it with an aqueous medium. In recent years, a cationic resin is generally used for the pigment grinding agent of electrodeposition paint.

It is known that a sulfonium group-containing resin is superior in corrosion resistance in comparison to the other cationic resins. However, when basic pigments such as titanium oxide and basic lead silicate are dispersed with the cationic resin, dispersibility of the resulting dispersion may become poor, because an electrostatic force of repulsion between the cationic resin and the basic pigments is generated.

On the other hand, in Japanese Laid-Open Patent Publication No. 60-161464, there is disclosed a cationized acrylic copolymer in which an unsaturated carboxylic acid is used as a part of monomers for producing it. Further, in Japanese Patent Application No. 4-33141, there is disclosed that excellent stability can be obtained by introducing a carboxyl group into a resin.

However, an acrylic resin is inferior in compatibility with a cationized epoxy resin which is generally used as a main binder in electrodeposition. Therefore, when an acrylic resin is used as a pigment grinding resin and the resulting pigment paste is introduced into the electrodeposition paint, corrosion resistance of the resulting coated film becomes poor.

SUMMARY OF THE INVENTION

In accordance of the present invention, there is provided a pigment grinding resin composition for an electrodeposition paint comprising a cationic pigment grinding resin obtained by reacting a modified epoxy resin with sulfide in the presence of a monobasic acid having 1 to 20 carbon atoms and a hydroxyl group-containing dibasic acid having up to 10 carbon atoms; wherein said modified epoxy resin is obtained by reacting at least one epoxy resin having an epoxy equivalent of 150 to 2000 selected from the group consisting of bisphenol A, F and S type epoxy resins with a half-blocked diisocyanate, and wherein said sulfide is represented by the formula:

$$R^1—S—R^2$$

wherein $R^1$ and $R^2$ may be the same or different and indicate an alkyl group, a hydroxy alkyl group or a hydroxyalkylene group having 2 to 12 carbon atoms.

In the cationic pigment grinding resin of the present invention, by introducing the acid group into the epoxy resin, the dispersibility of the pigment and the compatibility with the main binder, the cationized epoxy resin, were improved. By using this pigment grinding resin, a pigment paste as well as an electrodeposition paint having excellent storage stability is provided. The resulting electrodeposition paint is able to afford a coated film having excellent corrosion resistance.

DETAILED DESCRIPTION OF THE INVENTION

The epoxy resin which can be used in the present invention may be a so-called polyepoxide having at least one 1,2-epoxy group per molecule. An epoxy equivalent of the epoxy resin is preferably 150 to 2000, more preferably 400 to 1500. When the epoxy equivalent is smaller than 150, it is impossible to produce film at the time of electrodeposition and no film may be obtained. On the other hand, when the epoxy equivalent exceeds 2000, the amount of a cation group per molecule becomes insufficient, and provides poor water solubility.

Examples of the epoxy resin include polyglycidyl ether of polyphenol. The polyglycidyl ether of polyphenol can be obtained by reacting polyphenol with epichlorohydrin or dichlorohydrin in the presence of an alkali. Examples of the polyphenol include bisphenol A, F and S type epoxy resins and equivalents thereof.

The half-blocked diisocyanate with which the above epoxy resin will be reacted in order to prepare the modified epoxy resin can be obtained by reacting polyisocyanate with a compound having active hydrogen. It is preferred that this reaction is conducted by cooling to 40° to 50° C. while dropping an active hydrogen-containing compound under stirring, if necessary, in the presence of a tin catalyst. Regarding a reaction proportion of the polyisocyanate to active hydrogen-containing compound, a proportion of the active hydrogen-containing compound can be determined according to stoichiometric calculation so that an amount of the unblocked isocyanate group per molecule of the resulting half-blocked diisocyanate may be 1.0 to 0.5 molar equivalents, preferably 0.99 to 0.88 molar equivalents. When the amount of the unblocked isocyanate group is larger than 1.0 molar equivalent, gelation is likely to be arisen at the time of reacting with the epoxy resin. On the other hand, when the amount of the unblocked isocyanate group is smaller than 0.5 molar equivalents, the amount of full-blocked polyisocyanate which has not reacted with the epoxy resin increases and reduces water solubility.

The polyisocyanate which can be used may be anyone which contains two or more isocyanate groups per molecule and is not particularly limited. Typical examples thereof include aliphatic diisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidyne diisocyanate, butylidene diisocyanate, etc.; alicyclic diisocyanates such as isophorone diisocyanate, 1,3-cyclopentane diisocyanate, 1,4-cyclohexane diisocyanate, 1,2-cyclohexane diisocyanate, etc.; aromatic diisocyanates such as m-phenylene diisocyanate, p-phenylene diisocyanate, 4,4'-diphenyl diisocyanate, 1,5-naphthalene diisocyanate, 1,4-dinaphthalene diisocyanate, etc.; aliphatic-aromatic diisocyanates such as 4,4'-diphenylenemethane diisocyanate, 2,4- or 2,6-tolylene diisocyanate or a mixture thereof, 4,4'-toluidine diisocyanate, 1,4-xylylene diisocyanate, etc.; polynuclear substituted diisocyanates such as dianisidine diisocyanate, 4,4'-diphenyl ether diisocyanate, chlorodiphenylene diisocyanate, etc.; triisocyanates such as triphenylmethane-4,4',4"-triisocyanate, 1,3,5-triisocyanate toluene, etc.; tetraisocyanates such as 4,4'-diphenyl-dimethylmethane-2,2',5,5'-tetraisocyanate, etc.; polymerized polyisocyanates such as tolylene diisocyanate dimer and trimer, etc.

It is preferred that the polyisocyanate used in the present invention contains isocyanate groups having different reactivities in a molecule, which may be advantageous for a partial blocking reaction.

Examples of the active hydrogen compound used for preparing the half-blocked diisocyanate include alcohol, amine, carboxylic acid, oxime and caprolactam having 1 to 20 carbon atoms.

As the alcohol, there can be used aliphatic alcohols, alicyclic alcohols and phenols. Examples thereof include aliphatic alcohols such as methanol, ethanol, propanol, butanol, amyl alcohol, hexyl alcohol, 2-ethylhexyl alcohol, heptyl alcohol, octyl alcohol, nonyl alcohol, 3,3,5-trimethyl hexanol, decyl alcohol, lauryl alcohol, stearyl alcohol, ethylene glycol monomethyl ether, ethylene glycol monoethyl ether, ethylene glycol monobutyl ether, propylene glycol monomethyl ether, diethylene glycol monomethyl ether, diethylene glycol monomethyl ether, benzyl alcohol, etc.; alicyclic alcohols such as cyclohexanol, etc.; phenols such as phenol, crezol, xylenol, chlorophenol, ethylphenol, etc.

Examples of the amine include xylidine, aniline, butylamine, dibutylamine and the like. Examples of the carboxylic acid include formic acid, acetic acid, propionic acid, octylic acid, stearic acid and the like. Examples of the oxime include formamide oxime, acetaldoxime, acetoxime, methylethylketoxime, diacetyl monooxime, cyclohexane oxime and the like. Examples of the lactam include ε-caprolactam, δ-valerolactam, γ-butyrolactam, β-propiolactam and the like.

The modified epoxy resin can be obtained by reacting the epoxy resin with the half-blocked diisocyanate. The reaction is conducted by a normal method, but is preferably conducted at a temperature of about 140° C. so that an equivalent ratio of the epoxy resin to the half-blocked diisocyanate may be 1:2 to 1:1.

The modified epoxy resin thus obtained and sulfide are poured into deionized water and they are reacted by mixing with stirring in the presence of a monobasic acid and a hydroxyl group-containing dibasic acid to obtain a cationic pigment grinding resin of the present invention.

It is preferred that the reaction is conducted at a reaction temperature of 50° to 80° C., more preferably 60° to 75° C. Regarding preferable reaction proportion, an amount of sulfide is 1 to 5 equivalents based on the epoxy group of the modified epoxy resin, an amount of the hydroxyl group-containing dibasic acid is 0.1 to 0.2 equivalents based on the epoxy group and the amount of the monobasic acid is 1 to 1.1 equivalents. When they are not within the above range, the resulting resin may become poor in the objective pigment dispersibility.

It is considered that, in this reaction, a sulfonium group and an acid group as a hydrophilic group are introduced to give a hydrophilic property to the cationic pigment grinding resin of the present invention, thereby, and particularly by introducing the acid group, an interaction with a basic pigment is generated in the cationic pigment grinding resin of the present invention.

Sulfide may be anyone and is not particularly limited, but it has to react with the epoxy group and to contain no inhibitive group. Preferably, it is sulfide represented by the formula:

wherein $R^1$ and $R^2$ are the same as defined above. Examples thereof include diethyl sulfide, dipropyl sulfide, dibutyl sulfide, dihexyl sulfide, diphenyl sulfide, ethylphenyl sulfide, tetramethylene sulfide, pentamethylene sulfide, thiodiethanol, thiodipropanol, thiodibutanol, 1-(2-hydroxyethylthio)-2,3-propanediol, 1-(2-hydroxyethylthio)-2-propanol, 1-(2-hydroxyethylthio)-2-butanol, 1-(2-hydroxyethylthio)-3-butoxy-1-propanol and the like. More preferred examples thereof include 1-(2-hydroxyethylthio)-2,3-propanediol, 1-(2-hydroxyethylthio)-2-propanol, 1-(2-hydroxyethylthio)-2-butanol, 1-(2-hydroxyethylthio)-3-butoxy-1-propanol and the like.

Sulfide can be obtained by purchasing commercially available sulfides, or reacting thiol with an epoxy compound. For example, 1-(2-hydroxyethylthio)-2,3-propanediol, 1-(2-hydroxyethylthio)-2-butanol, or 1-(2-hydroxyethylthio)-3-butoxy-1-propanol can be obtained by reacting 2-mercaptoethanol with glycidol, 2-mercaptoethanol with 1,2-butylene oxide, or 2-mercaptoethanol with butyl glycidyl ether, respectively, according to a method known to those skilled in the art.

The hydroxyl group-containing dibasic acid used for introducing the acid group into the cationic pigment grinding resin of the present invention, there can be preferably used those which contain carbon atoms of up to 10, particularly up to 4. When the number of carbon atoms is larger than 10, the acidity becomes low, thereby storage stability may become poor. Preferred example thereof include tartaric acid, malic acid and the like. Among them, tartaric acid is particularly preferred. When using dibasic acids containing no hydroxyl group, such as succinic acid, adipic acid, phthalic acid, etc., good pigment dispersibility are not given to the resulting cationic pigment grinding resin.

Further, the monobasic acid may be anyone which can be a counter anion of sulfonium and known to those skilled in the art. Preferred examples thereof include formic acid, lactic acid, acetic acid, propionic acid, butyric acid, dimethylolpropionic acid, N-acetylglycine, N-acetyl-β-alanine and the like.

By the above reaction, there can be obtained a cationic pigment grinding resin which has an acid value of from 2 to 100, a tertiary sulfonium group equivalent of from 500 to 2000 and a blocked isocyanate group equivalent of from 100 to 40000 per molecule and contains a monobasic acid as a counter anion. In this case, the cationic pigment grinding resin may include a resin obtained by reacting the monobasic acid with the epoxy group as a side reaction, but there can be used any resin having an equivalent of functional group within the above range.

When the acid value is not within the above range, good storage stability can not be obtained. When the sulfonium group equivalent is larger than 2000, the corrosion resistance of the resulting coated film becomes poor. On the other hand, when it is smaller than 30, dispersibility of the resulting pigment grinding resin becomes poor. When the blocked isocyanate group equivalent is larger than 40000, hydration stability becomes poor. On the other hand, when it is smaller than 100, the dispersibility of the pigment becomes poor. The tertiary sulfonium group equivalent in the present invention is defined as a weight (g) of the resin which contains 1 g equivalent of sulfonium group.

However, in order to inhibit the above side reaction to the utmost, a first acid dissociation constant pKa1 of the hydroxyl group-containing dibasic acid is preferably smaller than an acid dissociation constant pKa of the monobasic acid. Examples of combination which satisfies this relation include a combination of tartaric acid (pKa1=2.8) with dimethylolpropionic acid (pKa=4.4), and a combination of tartaric acid (pKa1=2.8) with N-acetyl-β-alanine (pKa=4.6) and the like.

The cationic pigment grinding resin of the present invention can be used in combination with the other cationized epoxy resin. An example is a cationized epoxy resin having a sulfonium group equivalent of from 400 to 2000, which contains per molecule either at least one sulfonium group having a carboxylate ion as a counter anion or at least one nitrogen-containing basic group neutralized with an organic acid as a counter anion. Such a cationized epoxy resin may be derived from an epoxy resin having an epoxy equivalent of from 150 to 1000. Examples of the basic group having a nitrogen atom include primary, secondary and tertiary amino group, imidazole group, oxazolidine group and the like. It is preferred that the cationized resin is formulated in an amount of from 2 to 20 times based on the total weight of the cationic pigment grinding resin of the present invention, and an acid value of the composition obtained by mixing is preferably 3 to 10.

The pigment paste for the electrodeposition paint can be prepared by using the pigment grinding resin or pigment grinding resin composition for the electrodeposition paint of the present invention thus obtained and pigment in a weight ratio of 1:0.05 to 1:10, preferably 1:0.1 to 1:5, according to a method known to those skilled in the art.

The pigment may be anyone which is generally used and is not particularly limited. Examples thereof include iron oxide, strontium chromate, carbon black, titanium dioxide, talc, barium sulfate, cadmium yellow, cadmium red, chromic yellow, aluminum phosphomolybdate, zinc phosphomolybdate, basic lead silicate and a mixture thereof.

The electrodeposition paint can be obtained by mixing the resulting pigment paste with deionized water and a cationic pigment grinding resin and by further adding, as auxiliary agents, additives as are well known to those skilled in the art such as resins, solvents, antioxidants, surfactants, other auxiliary agents used in the electrodeposition process.

EXAMPLES

The following Preparation Examples, Examples and Comparative Examples further illustrate the present invention in detail but are not to be construed to limit the scope thereof. In the Preparation Examples, Examples and Comparative Examples, "parts" are by weight unless otherwise stated.

Preparative Example 1

Preparation of Polyurethane Crosslinking Agent 199.1 Parts of hexamethylene diisocyanurate was charged in a reaction vessel equipped with a stirrer, a cooling tube, a nitrogen introducing tube and a thermometer, and hexamethylene diisocyanurate was diluted with 31.6 parts of methyl isobutyl ketone (hereinafter abbreviated to "MIBK"). Then, 0.2 part of dibutyltin dilaurate was added and, after heating to 50° C., 87 parts of methylethylketooxime was added dropwise with stirring in a dry nitrogen atmosphere and the reaction temperature was maintained at 50° C. The mixture was maintained at 70° C. until disappearance of the isocyanate group by the measurement of infrared spectra. Thereafter, the reaction product was diluted with 35.8 parts of MIBK and 4.0 parts of n-butanol to give a polyurethane crosslinking agent.

Preparative Example 2

Preparation of Aminated Epoxy Resin

In a reaction vessel equipped with a stirrer, a cooling tube, a nitrogen introducing tube and a thermometer, 99.8 parts of epicoat 1001 (bisphenol A type epoxy resin having an epoxy equivalent of 475, manufactured by Yuka Shell Epoxy Co., Ltd.), 850.2 parts of epicoat 1004 (bisphenol A type epoxy resin having an epoxy equivalent of 950, manufactured by Yuka Shell Epoxy Co., Ltd.), 55 parts of nonylphenol, 193.3 parts of MIBK and 4.5 g of benzyldimethylamine were added. Then, the mixture was reacted at 140° C. for 4 hours to give a resin having an epoxy equivalent of 1175. To the resin, 69.1 parts of ethylene glycol n-hexyl ether, 35.4 parts of a MIBK solution (solid content: 78% by weight) of MIBK ketiminated product of 2-aminoethyl ethanolamine, 26.5 parts of N-methylethanolamine and 37.1 parts of diethanolamine were added and the mixture was reacted at 120° C. for 2 hours to give the objective resin.

Preparative Example 3

Preparation of
1-(2-Hydroxyethylthio)-2,3-Propanediol

In a reaction vessel equipped with a stirrer, a cooling tube, a nitrogen introducing tube and a thermometer, 78.1 parts of 2-mercaptoethanol was charged, and 2-mercaptoethanol was diluted with 159.6 parts of MIBK. Then, 0.41 part of dimethylbenzylamine was added and, after heating to 50° C., 81.5 parts of glycidol was added dropwise with stirring over 3 hours in a dry nitrogen atmosphere. The reaction vessel was cooled and maintained at 50° C. 2 Hours after dropping, it was confirmed that an absorption of —SH (2540 $cm^{-1}$) and an absorption of a glycidyl group (910 $cm^{-1}$) are disappeared by the measurement of infrared spectra. Further, the reaction product had no mercapto-like odor. Thereafter, MIBK was removed under reduced pressure to give 1-(2-hydroxyethylthio)-2,3-propanediol as a viscous liquid. Yield was 90% of the charge weight.

Example 1

Preparation of Half-Blocked Diisocyanate 222.2 Part of isophorone diisocyanate (hereinafter abbreviated to "IPDI") was charged in a reaction vessel equipped with a stirrer, a nitrogen introducing tube and a cooling tube, and IPDI was diluted with 39.1 parts of MIBK. Then, 0.2 part of dibutyltin dilaurate was added and, after heating to 50° C., 131.5 parts of 2-ethylhexanol was added dropwise with stirring over 2 hours in a dry nitrogen atmosphere. The reaction temperature was maintained at 50° C. to give 2-ethylhexanol half-blocked IPDI (solid content: 90%).

Preparation of Modified Epoxy Resin and Pigment Grinding Resin 376.0 Parts of Epon 828 (epoxy resin manufactured by Shell Chemical Co., epoxy equivalent: 190) and 96.9 parts of bisphenol A were charged in a reaction vessel equipped with a stirrer, a nitrogen introducing tube and a cooling tube. After heating to 130° C. in a nitrogen atmosphere, 0.75 part of benzyldimethylamine was added and the mixture was reacted at 170° C. for about one hour to give a bisphenol type epoxy resin having an epoxy equivalent of 411. After cooling to 140° C., 228.3 parts of 2-ethylhexanol half-blocked IPDI prepared hereinabove (solid content: 205.5 parts) was added and the reaction was conducted.

The mixture was maintained at 140° C. for one hour and diluted with 255.6 parts of dipropylene glycol monobutyl ether. Then, the reaction mixture was cooled to 100° C., and 568.2 parts of 1-(2-hydroxyethylthio)-2,3-propanediol (solid content: 189.4 parts) obtained in Preparative Example 3, 15.0 parts of tartaric acid, 140.7 parts of dimethylolpropionic acid and 144.0 parts of deionized water were added. The mixture was reacted at 70° to 75° C. until the acid value becomes 8.0 to give a resin having a tertiary sulfonium conversion ratio of 82%. This was diluted with 221.5 parts of dipropylene glycol monobutyl ether to give a pigment grinding resin (solid content: 50%).

Example 2

According to the same manner as that described in Example 1 except for using 408.0 parts of SHP-100 (1-(2-hydroxyethylthio)-2-propanol, manufactured by Sanyo Kasei Co., Ltd., solid content: 136.0 parts) in place of 1-(2-hydroxyethylthio)-2,3-propanediol and using 207.2 parts and 323.4 parts of dipropylene glycol monobutyl ether, a pigment grinding resin was obtained.

Example 3

According to the same manner as that described in Example 1 except for using 13.4 parts of malic acid in place of tartaric acid and using 220.0 parts of dipropylene glycol monobutyl ether to be finally added, a pigment grinding resin was obtained.

Comparative Example 1

Preparation 1 of pigment grinding resin using dibasic acid containing no hydroxyl group According to the same manner as that described in Example 1 except for using 16.6 parts of terephthalic acid in place of tartaric acid and using 223.2 parts of dipropylene glycol monobutyl ether to be finally added, a pigment grinding resin was obtained.

Comparative Example 2

Preparation 2 of pigment grinding resin using dibasic acid containing no hydroxyl group According to the same manner as that described in Example 1 except for using 14.6 parts of adipic acid in place of tartaric acid and using 221.2 parts of dipropylene glycol monobutyl ether to be finally added, a pigment grinding resin was obtained.

Comparative Example 3

Preparation 3 of pigment grinding resin using dibasic acid containing no hydroxyl group According to the same manner as that described in Example 1 except for using 11.8 parts of succinic acid in place of tartaric acid and using 218.4 parts of dipropylene glycol monobutyl ether to be finally added, a pigment grinding resin was obtained.

Comparative Example 4

Synthesis 1 of pigment grinding resin using no dibasic acid 376.0 Parts of Epon 828 and 114.0 parts of bisphenol A were charged in a reaction vessel equipped with a stirrer, a nitrogen introducing tube and a cooling tube and heated to 130° C. in a nitrogen atmosphere. To this was added 0.75 part of benzyldimethylamine and the mixture was reacted at 170° C. for about one hour to give a bisphenol A type epoxy resin having an epoxy equivalent of 490. After cooling to 140° C., 198.4 parts of 2-ethylhexanol half-blocked isophorone diisocyanate (solid content: 178.6 parts) was added and maintained at 140° C. for one hour.

The epoxy resin thus obtained was diluted with 161.8 parts of dipropylene glycol monobutyl ether and, after cooling to 100° C., 366.0 parts of 2,2'-thiobis(ethanol) (solid content: 122.1 parts), 134.0 parts of dimethylolpropionic acid and 144.0 parts of deionized water were added. This mixture was reacted at 70° to 75° C. until the acid value becomes 3.0 to give a resin having a tertiary sulfonium modification rate of 72%. Then, this resin was diluted with 353.5 parts of dipropylene glycol monobutyl ether to give a pigment grinding resin (solid content: 50%).

Comparative Example 5

Synthesis 2 of pigment grinding resin using no dibasic acid 533.2 Parts of Epon 828, 199.6 parts of bisphenol A and 19.2 parts of nonylphenol were charged in a reaction vessel equipped with a stirrer, a nitrogen introducing tube and a cooling tube and heated to 107° C. in a nitrogen atmosphere to dissolve bisphenol A. Then, 0.75 part of ethyltriphenylphosphonium iodide was added and heated at 125° C. The reaction mixture was cooled to 75° C., and 201.6 parts of propylene glycol monobutyl ether, 122.1 parts of 2,2'-thiobis(ethanol), 134.1 parts of dimethylolpropionic acid and 30.6 parts of deionized water were added. The mixture was reacted at 70° to 75° C. until the acid value becomes 3.0 or less. Then, this resin was diluted with water until the solid content becomes 30% to give a pigment grinding resin.

Comparative Example 6

Preparation of Quaternizing Agent 174.0 Parts of tolylene diisocyanate (hereinafter abbreviated to "TDI") was charged in a reaction vessel equipped with a stirrer, a nitrogen introducing tube and a cooling tube and, after diluting with 33.9 parts of MIBK, 0.2 part of dibutyltin dilaurate was added. After heating to 50° C., 131.5 parts of 2-ethylhexanol was added dropwise with stirring over 2 hours in a dry nitrogen atmosphere to conduct the dropping reaction. The reaction temperature was maintained at 50° C. to give 2-ethylhexanol half-blocked TDI. 320.0 Parts of this 2-ethylhexanol half-blocked TDI (solid content: 304.0 parts) was added to 87.2 parts of dimethylethanolamine at room temperature and, as a result, exothermic reaction occurred. After stirring at 80° C. for one hour, 117.6 parts of an aqueous 75% lactic acid (solid content: 88.2 parts) was added and 39.2 parts of ethylene glycol monobutyl ether was further added. The reaction mixture was stirred at 65° C. for about half an hour to give a quaternizing agent.

Preparation of pigment grinding resin containing quaternary ammonium group 681.2 Parts of Epon 828 (bisphenol A type epoxy resin having an epoxy equivalent of 190, manufactured by Yuka Shell Co., Ltd.) and 289.6 parts of bisphenol A were charged in a reaction vessel equipped with a stirrer, a nitrogen introducing tube and a cooling tube, and the mixture was reacted at 150° to 160° C. for about one hour in a nitrogen atmosphere. After cooling to 120° C., 406.4 parts of 2-ethylhexanol half-blocked TDI (solid content: 386.1 parts) was added. After cooling to 85° to 95° C. and homogenizing, 496.3 parts of the quaternizing agent (solid content: 421.9 parts) prepared hereinabove and 71.2 parts of deionized water were added. The reaction mixture was maintained at 80° to 85° C. until the acid value becomes 1 or less. Then, the mixture was diluted with 85.6 parts of ethylene glycol monobutyl ether to give a pigment grinding resin.

In the following Examples 4 to 6 and Comparative Examples 7 to 12, in order to evaluate the storage stability when using a basic pigment, a pigment paste of titanium dioxide R-900P (manufactured by Du Pont Co.), which indicates basic at the pH range of a cationic electrodeposition paint, was prepared.

Example 4

Preparation 1 of pigment paste containing basic pigment 30.0 Parts of a pigment grinding resin (solid content: 15.0 parts) prepared in Example 1, 75.4 parts of deionized water and 100.0 parts of titanium dioxide R-900P were dispersed using a sand grind mill to prepare a pigment paste ground to a particle size of 10 μ or less. This pigment paste had a total solid content of 56.0%, a solid content of 7.3% and a pigment solid content of 48.7%.

Example 5

Preparation 2 of pigment paste containing basic pigment

According to the same manner as that described in Example 4 except for using a pigment grinding resin of Example 2 in place of a pigment grinding resin of Example 1, a pigment paste was prepared.

Example 6

Preparation 3 of pigment paste containing basic pigment

According to the same manner as that described in Example 4 except for using a pigment grinding resin of Example 5 in place of a pigment grinding resin of Example 1, a pigment paste was prepared.

Comparative Example 7

Preparation 4 of pigment paste containing basic pigment

According to the same manner as that described in Example 4 except for using a pigment grinding resin of Comparative Example 1 in place of a pigment grinding resin of Example 1, a pigment paste was prepared.

Comparative Example 8

Preparation 5 of pigment paste containing basic pigment

According to the same manner as that described in Example 4 except for using a pigment grinding resin of Comparative Example 2 in place of a pigment grinding resin of Example 1, a pigment paste was prepared.

Comparative Example 9

Preparation 6 of pigment paste containing basic pigment

According to the same manner as that described in Example 4 except for using a pigment grinding resin of Comparative Example 3 in place of a pigment grinding resin of Example 1, a pigment paste was prepared.

Comparative Example 10

Preparation 7 of pigment paste containing basic pigment

According to the same manner as that described in Example 4 except for using a pigment grinding resin of Comparative Example 4 in place of a pigment grinding resin of Example 1, a pigment paste was prepared.

Comparative Example 11

Preparation 8 of pigment paste containing basic pigment

According to the same manner as that described in Example 4 except for using a pigment grinding resin of Comparative Example 5 in place of a pigment grinding resin of Example 1, a pigment paste was prepared.

Comparative Example 12

Preparation 9 of pigment paste containing basic pigment

According to the same manner as that described in Example 4 except for using a pigment grinding resin of Comparative Example 6 in place of a pigment grinding resin of Example 1, a pigment paste was prepared.

Example 7

Evaluation of storage stability of pigment paste

Regarding pigment-dispersed pastes prepared in Examples 4 to 6 and Comparative Examples 7 to 12, the storage stability of the pigment paste was evaluated by observing the state of the sedimentation after storing at 40° C. for 2 weeks. The evaluation results are shown in Table 1.

TABLE 1

| Example No. | Storage stability[1] | Change in viscosity[2] |
| --- | --- | --- |
| Example 4 | o | 2.0 |
| Example 5 | o | 1.0 |
| Example 6 | Δ | 2.5 |
| Comp. Example 7 | Δ | 12.0 |
| Comp. Example 8 | Δ | 11.5 |
| Comp. Example 9 | Δ | 10.8 |
| Comp. Example 10 | o | 20.0 |
| Comp. Example 11 | x | —[3] |
| Comp. Example 12 | o | 5.5 |

[1] After storing at 40° C. for 2 weeks, the state of the sedimentation of the paste was evaluated by visual check according to the following evaluation standard.
o: No sedimentation
Δ: Soft sedimentation
x: Hard sedimentation
[2] Change in viscosity of the paste after storing at 40° C. for 2 weeks (unit: Ku)
[3] Impossible to measure

Example 8

Preparation 1 of Pigment Paste 30.0 Parts of a pigment grinding resin (solid content: 15.0 parts) prepared in Example 1, 75.4 parts of deionized water, 68.9 parts of titanium dioxide R-900P, 14.4 parts of kaolin, 15.0 parts of aluminum phosphomolybdate and 1.7 parts of carbon black were dispersed using a sand grind mill to prepare a pigment paste ground to a particle size of 10 μ or less. This pigment paste had a total solid content of 56.0%, a solid content of 7.3% and a pigment solid content of 48.7%.

Example 9

Preparation 2 of Pigment Paste

According to the same manner as that described in Example 6 except for using a pigment grinding resin of Example 2 in place of a pigment grinding resin of Example 1, a pigment paste was prepared.

Example 10

Preparation 3 of Pigment Paste

According to the same manner as that described in Example 6 except for using a pigment grinding resin of Example 5 in place of a pigment grinding resin of Example 1, a pigment paste was prepared.

Comparative Example 13

Preparation 4 of Pigment Paste

According to the same manner as that described in Example 6 except for using a pigment grinding resin of Comparative Example 1 in place of a pigment grinding resin of Example 1, a pigment paste was prepared.

Comparative Example 14

Preparation 5 of Pigment Paste

According to the same manner as that described in Example 6 except for using a pigment grinding resin of Comparative Example 2 in place of a pigment grinding resin of Example 1, a pigment paste was prepared.

Comparative Example 15

Preparation 6 of Pigment Paste

According to the same manner as that described in Example 6 except for using a pigment grinding resin of Comparative Example 3 in place of a pigment grinding resin of Example 1, a pigment paste was prepared.

Comparative Example 16

Preparation 7 of Pigment Paste

According to the same manner as that described in Example 6 except for using a pigment grinding resin of Comparative Example 4 in place of a pigment grinding resin of Example 1, a pigment paste was prepared.

Comparative Example 17

Preparation 8 of Pigment Paste

According to the same manner as that described in Example 6 except for using a pigment grinding resin of Comparative Example 5 in place of a pigment grinding resin of Example 1, a pigment paste was prepared.

Comparative Example 18

Preparation 9 of Pigment Paste

According to the same manner as that described in Example 6 except for using a pigment grinding resin of Comparative Example 6 in place of a pigment grinding resin of Example 1, a pigment paste was prepared.

Example 9

Evaluation of Storage Stability of Pigment Paste

Regarding pigment-dispersed pastes prepared in Examples 6 to 8 and Comparative Examples 4 to 6, the storage stability of the pigment paste was evaluated by observing the state of the sedimentation after storing at 40° C. for 2 weeks. The evaluation results are shown in Table 2.

TABLE 2

| Example No. | Storage stability[1] | Change in viscosity[2] |
| --- | --- | --- |
| Example 8 | o | 2.0 |
| Example 9 | o | 1.5 |
| Example 10 | o~Δ | 4.0 |
| Comp. Example 13 | Δ | 8.0 |
| Comp. Example 14 | Δ | 9.0 |
| Comp. Example 15 | Δ | 10.0 |
| Comp. Example 16 | Δ | 6.0 |
| Comp. Example 17 | x | —[3] |
| Comp. Example 18 | Δ | 8.5 |

[1]After storing at 40° C. for 2 weeks, the state of the sedimentation of the paste was evaluated by visual check according to the following evaluation standard.
o: No sedimentation
Δ: Soft sedimentation
x: Hard sedimentation
[2]Change in viscosity of the paste after storing at 40° C. for 2 weeks (unit: Ku)
[3]Impossible to measure

Example 11

Preparation 1 of Cationic Electrodeposition Paint 331.9 Parts of a polyurethane crosslinking agent obtained in Preparative Example 1 and 576.0 parts of an aminated epoxy resin obtained in Preparative Example 2 were mixed with 30.3 parts of n-hexyl cellosolve and, after neutralizing with 12.3 parts of glacial acetic acid, the mixture was diluted slowly with 1067.0 parts of deionized water. Then, the organic solvent was removed under reduced pressure until the solid content becomes 36.0%. 546.8 Parts of a pigment paste prepared in Example 5 was added and the mixture was uniformly mixed, and then 2598.2 parts of deionized water was added to give a cationic electrodeposition paint having a solid content of 20.0%.

Example 12

Preparation 2 of Cationic Electrodeposition Paint

According to the same manner as that described in Example 11 except for substituting a pigment paste prepared in Example 9 for that prepared in Example 8, a cationic electrodeposition paint was obtained.

Example 13

Preparation 3 of Cationic Electrodeposition Paint

According to the same manner as that described in Example 11 except for substituting a pigment paste prepared in Example 10 for that prepared in Example 8, a cationic electrodeposition paint was obtained.

Comparative Example 19

Preparation 4 of Cationic Electrodeposition Paint

According to the same manner as that described in Example 11 except for substituting a pigment paste prepared in Example 13 for that prepared in Example 8, a cationic electrodeposition paint was obtained.

Comparative Example 20

Preparation 5 of Cationic Electrodeposition Paint

According to the same manner as that described in Example 11 except for substituting a pigment paste prepared in Example 14 for that prepared in Example 8, a cationic electrodeposition paint was obtained.

Comparative Example 21

Preparation 6 of Cationic Electrodeposition Paint

According to the same manner as that described in Example 11 except for substituting a pigment paste prepared in Example 15 for that prepared in Example 8, a cationic electrodeposition paint was obtained.

Comparative Example 22

Preparation 7 of Cationic Electrodeposition Paint

According to the same manner as that described in Example 11 except for substituting a pigment paste prepared in Example 16 for that prepared in Example 8, a cationic electrodeposition paint was obtained.

Comparative Example 23

Preparation 8 of Cationic Electrodeposition Paint

According to the same manner as that described in Example 11 except for substituting a pigment paste prepared in Example 17 for that prepared in Example 8, a cationic electrodeposition paint was obtained.

Comparative Example 2

Preparation 9 of Cationic Electrodeposition Paint

According to the same manner as that described in Example 11 except for substituting a pigment paste prepared in Example 18 for that prepared in Example 8, a cationic electrodeposition paint was obtained.

Example 14

Evaluation of storage stability of cationic electrodeposition paint

The storage stability of cationic electrodeposition paints obtained in Examples 11 to 13 and Comparative Examples 19 to 24 was evaluated with the amount having passed through a 380 mesh filter and the amount of residue measured with the electrodeposition paint having been stored for 4 weeks at 40° C. under stirring. The results are shown in Table 3.

Evaluation of corrosion resistance to salty water of cationic electrodeposition paint The above cationic electrodeposition paint was electrodeposited on a cold-rolled steel sheet (without a zinc phosphate treatment) in a thickness of 10 μ and, after baking at 160° C. for 10 minutes, cross-cut was made into the paint film and the specimen was immersed for 120 hours by a salt water spray test (SST). Then, an adhesive tape 2.4 cm in width (manufactured by Nichiban Co., Ltd., trade name "Cello tape") was applied securely on the specimen by finger, and the adhesive tape was quickly peeled off. The salt water corrosion resistance of the electrodeposition paint was evaluated by measuring the width of peeling of the paint film from the steel sheet. The results are shown in Table 3.

TABLE 3

| Example No. | Storage stability[1] | Crrosion resistance to salty water[2] |
|---|---|---|
| Example 11 | o (3 mg) | o |
| Example 12 | o (2 mg) | o |
| Example 13 | o (5 mg) | o |
| Comp. Example 19 | Δ (48 mg) | o |
| Comp. Example 20 | Δ (35 mg) | o |
| Comp. Example 21 | Δ (36 mg) | o |
| Comp. Example 22 | Δ (7 mg) | o |
| Comp. Example 23 | Δ (>100 mg) | o |
| Comp. Example 24 | o (18 mg) | x |

[1] The storage stability of the electrodeposition paint was evaluated with the amount having passed through a 380 mesh filter and the amount of residue measured with the electrodeposition paint having been stored for 4 weeks at 40° C. under stirring, according to the following standard:
o: filtered smoothly
Δ: hard to filter
x: not filtered due to clogging
Further, the weight in parentheses indicates the amount of residue after filtration.
[2] Evaluation standard of corrosion resistance to salty water
o: Width of peeling is less than 2 mm
Δ: Width of peeling is 2 to 3 mm
x: Width of peeling is 3 mm or more

What is claimed is:

1. A pigment grinding resin composition for an electrodeposition paint comprising a cationic pigment grinding resin obtained by reacting a modified epoxy resin with sulfide in the presence of a monobasic acid having 1 to 20 carbon atoms and a hydroxyl group-containing dibasic acid having up to 10 carbon atoms;

wherein said modified epoxy resin is obtained by reacting at least one epoxy resin having an epoxy equivalent of 150 to 2000 selected from the group consisting of bisphenol A, F and S type epoxy resins with a half-blocked diisocyanate, and wherein said sulfide is selected from the group consisting of 1-(2-hydroxyethylthio)-2-propanol, 1-(2-hydroxyethylthio)-2-butanol and 1-(2-hydroxyethylthio)-3-butoxy-1-propanol.

2. The pigment grinding resin composition for an electrodeposition paint according to claim 1, wherein the half-blocked diisocyanate is obtained by reacting polyisocyanate with a compound having active hydrogen.

3. The pigment grinding resin composition for an electrodeposition paint according to claim 1, wherein the cationic pigment grinding resin has an acid value of from 2 to 100 and a tertiary sulfonium group equivalent of from 500 to 2000.

4. The pigment grinding resin composition for an electrodeposition paint according to any one of claims 1, 2 and 3, further comprising a cationized epoxy resin which contains per molecule either at least one sulfonium group having a carboxylate ion as a counter anion or at least one nitrogen-containing basic group neutralized with an organic acid as a counter anion.

5. A pigment paste for an electrodeposition paint containing a pigment and the pigment grinding resin composition according to claim 4.

6. The pigment paste for an electrodeposition paint according to claim 5, wherein the pigment is selected from the group consisting of iron oxide, strontium chromate, carbon black, titanium dioxide, talc, barium sulfate, cadmium yellow, cadmium red, chromic yellow, aluminum phosphomolybdate, zinc phosphomolybdate, basic lead silicate and a mixture thereof.

* * * * *